APPARATUS FOR DEMODULATING AN FM CARRIER

Filed Dec. 7, 1964 2 Sheets-Sheet 1

INVENTOR.
OWEN J. OTT
BY Kenyon & Kenyon
ATTORNEYS

Oct. 22, 1968 O. J. OTT 3,407,358

APPARATUS FOR DEMODULATING AN FM CARRIER

Filed Dec. 7, 1964 2 Sheets-Sheet 2

INVENTOR.
OWEN J. OTT
BY Kenyon & Kenyon
ATTORNEYS

United States Patent Office 3,407,358
Patented Oct. 22, 1968

3,407,358

APPARATUS FOR DEMODULATING AN FM CARRIER

Owen J. Ott, Brookfield, Conn., assignor to Data-Control Systems, Inc., Danbury, Conn., a corporation of Delaware Filed Dec. 7, 1964, Ser. No. 416,397
8 Claims. (Cl. 329—110)

ABSTRACT OF THE DISCLOSURE

The disclosure relates to a circuit for demodulating a frequency modulated carrier input signal. In the circuit the input signal is converted to a waveform corresponding in frequency to the input signal. The waveform is applied to a timing capacitor which in turn controls a pair of switching devices. The timing capacitor is driven between two control levels and thus is not discharged during operations. The switching means are alternately conductive in response to the different excursions of the converted waveform. Means are provided for producing an output signal from the current of at least one of the switching means. In this way the output signal is derived which represents a function of the frequency of the input signal.

This invention relates to demodulation and more in particular to the demodulation of an FM carrier.

Frequency modulated carriers are commonly used in telemetering systems. By way of example, in a data transmission telemetering system, data measured by each of a plurality of transducers located at one location is represented by an analog voltage which modulates a voltage controlled frequency modulated oscillator. As a result, the output signal frequency or subcarrier from each oscillator represents the measured data. To enable a plurality of subcarriers to be transmitted simultaneously on a single radio link, subcarriers having different frequency assignments are added and the resulting composite signal modulates a frequency modulated transmitter. At the other or receiving location, a receiver reproduces the sum of the subcarriers and by means of a plurality of different band pass filters, each subcarrier may be separated from the others. In order to derive from a particular subcarrier the data which was originally represented by an analog voltage, it is necessary to detect the deviation of the subcarrier frequency from its band center value.

Heretofore frequency modulated carriers or subcarriers have been demodulated with circuits such as a one shot multi-vibrator, a Foster-Seeley discriminator, or a phase-locked loop. Each of these circuits when implemented in a form providing ease of channel switching and satisfactory linearity and drift is a comparatively complex one which includes a plurality of loops or stages having a number of components. As a result of the complexity, each of the circuits can be relatively costly and require an appreciable amount of space. As a result, in an application which requires a great number of channels or subcarriers, each of which must be demodulated, it can be understood that the cost and space factors can become excessive if not prohibitive.

In systems which transmit data by frequency modulated carriers, the extraordinary diversity of bandwidth requirements of the various channels can present difficulties with many forms of demodulating circuits, since it is highly desirable that a single demodulating circuit be suitable for demodulating any one of a plurality of received channels by the simple replacement of a plug-in tuning unit connected to the demodulating circuit. More particularly there can be great extremes of carrier frequencies which must be demodulated and the frequency of the data signal extends over a substantially large spectrum. For example, a demodulator for an FM carrier in a telemetering system may be required to reproduce the output of extremely low frequency thermocouple signals which can approach DC, radiation detectors which can be of high frequency, or vibration transducers which can be of intermediate frequencies in the realm of 10 kilocycles. Thus it is not uncommon in a data transmission system to be confronted with data signals having a frequency range from DC to 500 kilocycles and carriers ranging from a few c.p.s. to several megacycles. In demodulating systems having a plurality of circuits, such a frequency range can complicate the design and make the obtaining of a suitable frequency response characteristic quite difficult.

It is therefore one of the objects of the invention to provide a circuit for demodulating a frequency modulated carrier which is modulated with an information signal having a relatively large range of frequencies.

It is another object of the invention to provide an FM demodulating circuit which employs switching components for detecting the signal frequency.

It is still another object of the invention to provide an FM carrier demodulating circuit which is relatively simple in design and employs a reduced number of components.

It is an additional object of the invention to provide an FM carrier demodulating circuit which lends itself to an inexpensive and compact arrangement.

In one embodiment of the invention, the circuit for demodulating a frequency modulated carrier input signal includes means responsive to the input signal for producing a waveform corresponding in frequency to the input signal. Each successive excursion of the waveform is in an opposite sense between predetermined levels. The circuit further includes means connected to the waveform producing means for storing charge in response to a charging current. A pair of switching means are connected to the storing means for conducting charging currents with respect thereto. Each of the switching means is actuated in response to an excursion of the waveform applied to the storing means which has a different sense in order to conduct the charging current to the storing means. The circuit of the invention also includes means in circuit with at least one of the switching means for producing an output signal in response to the charging current being conducted by the one switching means. In this way, the output signal produced by the circuit of the invention represents a function of the frequenecy of the input signal.

The demodulating circut of the invention achieves simplicity by virtue of the reduced number of components which it employs since in the circuit it is merely necessary to produce the waveform corresponding to the frequency of input signal and to conduct charging currents to the charge storing means. In response to the pulses the ouput signal is then derived from the charging current conducted by at least one of the means for conducting the charge.

In still another embodiment of the invention the waveform derived from the input signals has a substantially rectangular form.

In still another embodiment of the invention the charge storage means is driven by an input signal which has been shaped to a trapezoidal waveform.

In an additional embodiment of the invention the circuit includes means for producing substantially a trapezoidal waveform corresponding in frequency to the input signal. A trapezoidal waveform, as opposed to a rectangular waveform has less higher frequency harmonics and consequently can be generated by using circuitry having less peak current capability.

In a further embodiment of the invention this circuit includes means for filtering out the relatively higher frequency portion of the frequency from the signal producing means in order to produce an output signal. This arrangement eliminates the higher frequency component which corresponds to the carrier frequency and its harmonics and sidebands since this component does not represent the information signal.

In still a further embodiment of the invention the circuit includes means for combining the signals from each of the signal producing means in order to produce an output signal. With this arrangement the output signal reflects a signal demodulated from the full wave of the carrier.

For a more complete understanding of the present invention reference should be had to the following specification and to the appended drawings in which.

Figure 1:
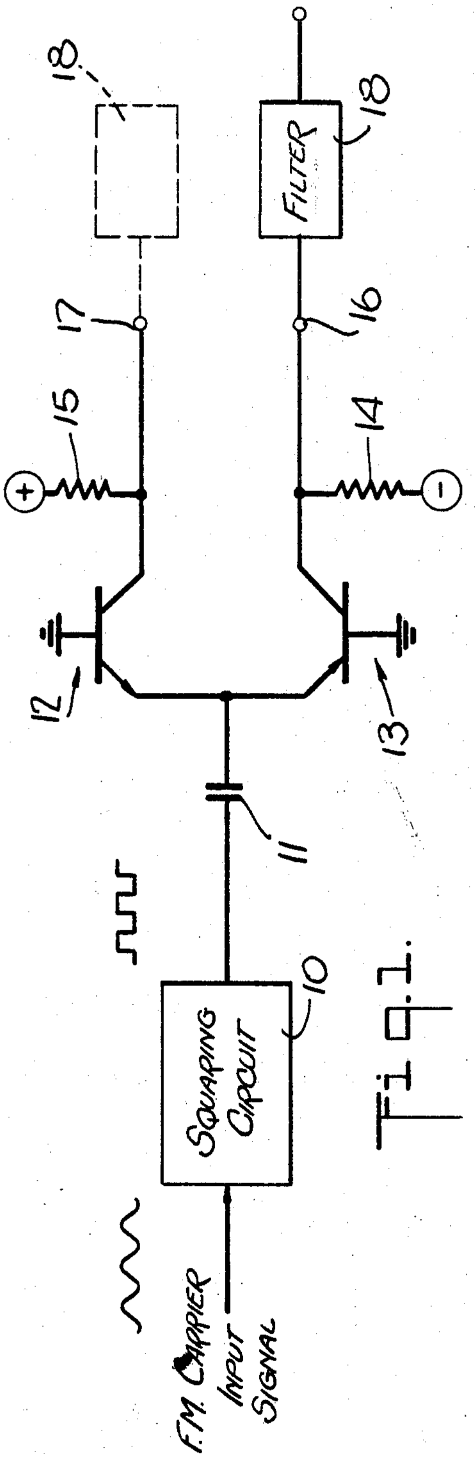
FIG. 1 is a schematic representation of an embodiment of the demodulating circuit of the invention.

In FIG. 1 of the drawings the input signal to squaring circuit 10 is indicated as a frequency modulated carrier. By way of example the input signal can be one derived from the receiver of a telemetering system. At the transmitter of such a system, the data measured by each transducer is represented by an analog voltage which is used to modulate a voltage controlled frequency modulated oscillator. The resulting signal or subcarrier is combined with a plurality of other different subcarriers which are to be transmitted simultaneously. The subcarriers are added and their sum modulates the frequency modulated transmitter. The receiver of the system reproduces the sum of the subcarriers and by means of band pass filters, the subcarriers are separated from one another.

The FM carrier to be demodulated is passed through means responsive to the input signal for producing a waveform corresponding in frequency to the input signal, that is to say, squaring circuit 10. As a result the sinusoidal wave form of the carrier is converted to a substantially rectangular or square waveform. Thus, the squaring circuit, in response to the input signal or carrier produces a waveform which corresponds in frequency to the input signal with each successive excursion of the waveform being in the opposite sense between predetermined levels. In this way, the output of the squaring circuit can provide a fixed drive level for the means for storing charge in response to a charging current, that is capacitor 11.

As shown in FIG. 1, the means for conducting charging current to the timing capacitor or the pair of switching means includes transistors 12 and 13, which are operated in the grounded base configuration. As a result, the emitters and the means for storing charge or timing capacitor 11 commonly connected thereto are held very close to ground potential. Timing capacitor 11 serves as a charge transfer device so that the current pulses from squaring circuit 10 have a charge proportional to the voltage excursion of the square wave and to the magnitude of the timing capacitor. With this arrangement, during the positive excursion of the output of squaring circuit 10, the charging current in timing capacitor 11 flows through transistor 13 into load resistor 14. On the other hand during the negative excursion of the output of squaring circuit 10, the charging current in timing capacitor 11 flows through transistor 12 from load resistor 15. As a result during each half cycle of the carrier signal, a charging current proportional to the voltage excursion of the square wave and also proportional to the magnitude of the timing capacitor is delivered to one of the load resistors, that is the means for producing an output signal in response to the charging current being conducted by one of the conducting means. Consequently, each resistor has an average current proportional to the frequency. Thus, an output signal representing a function of the frequency of the input signal can be derived at either of terminals 16 or 17 which is in response to the charging current being conducted by one of the switching means or transistors through resistors 14 and 15, respectively.

Since the output signal from either of terminals 16 or 17 contains frequency components corresponding to that of the carrier, filter circuit 18 can be connected to either one of terminals 16 or 17 in order to derive the average level of the charging current which is a function of the frequency of the modulated carrier. Filter 18, that is the means for filtering out the relatively higher frequency portion of the signal from the transistors can be a conventional low-pass filter arrangement.

The demodulating circuit of FIG. 1 is not restricted by its components or portions of the circuit to a comparatively narrow range of frequencies. Therefore, it is suitable for wide band FM carrier transmission systems. Since the circuit responds to the charging current of the timing capacitor 11 and since the charging of the timing capacitor is controlled by the carrier frequency, the system is capable of detecting DC information signals which have modulated the carrier. Thus, for example, with a one megacycle carrier, information signals from DC to approximately 500 kilocycles can be detected. In addition the circuit of the invention is capable of excellent transfer linearity characteristics.

Figure 2:
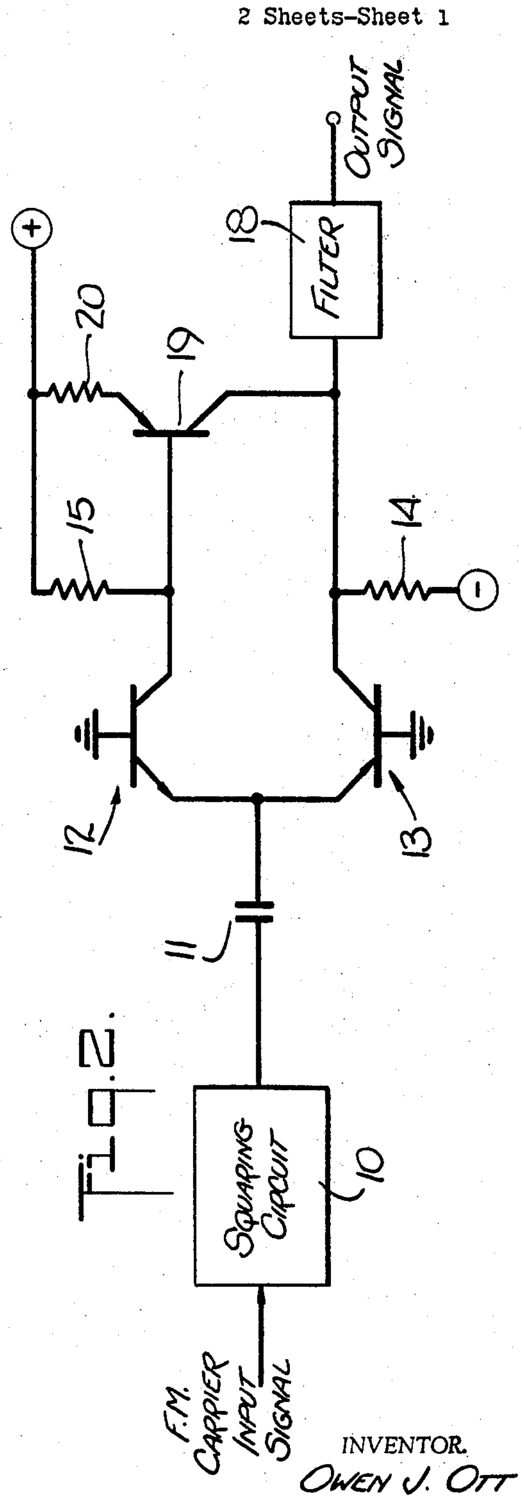
FIG. 2 is a schematic representation of the demodulating circuit of the invention showing an inverter for combining the output signal from each half cycle of the input signal.

The output of one of resistors 14 and 15 can be employed as the output signal after it has been filtered so long as the information signal which has modulated the carrier is not of a frequency which would allow a change within a cycle of the carrier since such a change would not be sensed by the demodulating circuit of the invention. However, where it is desired to modulate the carrier with information signals which can change within a cycle of the carrier, the output from each of resistors 14 and 15 can be combined as shown in FIG. 2. Transistor 19 which has its emitter and base connected across resistor 15 forms an inverter circuit for the charging current flowing through resistor 15. Thus, the charging current for resistor 15, being across the base-to-emitter circuit of transistor 19, drives the transistor so that an inverted signal corresponding to the current through resistor 15 is coupled through resistor 20 and transistor 19 to filter 18. The filter also receives the output of transistor 13 which is a function of the current passing through resistor 14. Consequently by inverting the signal produced by transistor 12, it can be combined with that produced by transistor 13. The combined signal after passing through filter 18 forms the output signal which is a function of the frequency of the information signal modulating the carrier. This inversion and summing system doubles the frequency of carrier ripple associated with the desired signal thereby making the design of filter 18 feasible when very high frequency intelligence components are being handled.

Figures 3, 4:
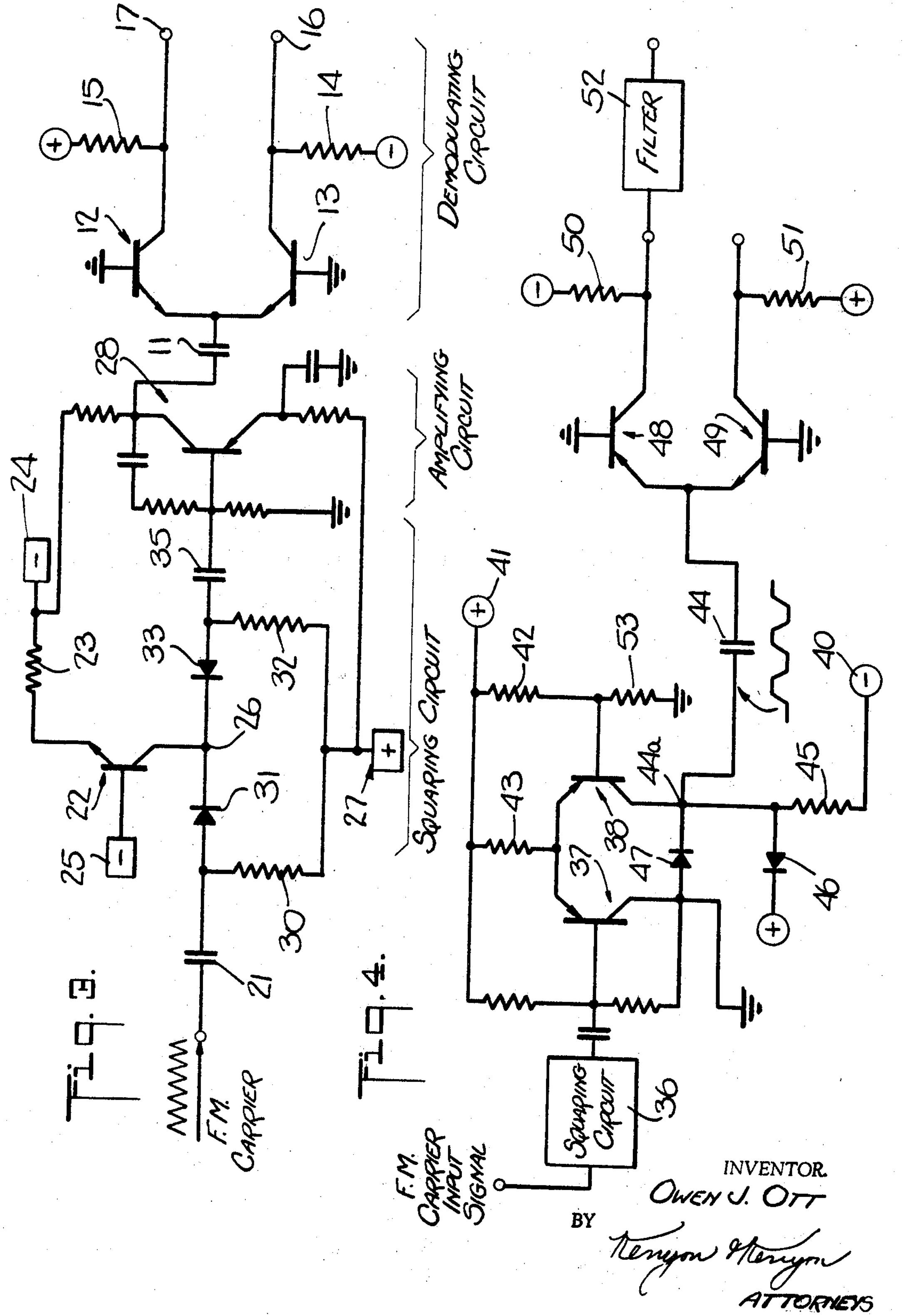
FIG. 3 is a schematic representation of the demodulating circuit of the invention shown connected to a circuit for squaring the input signal.
FIG. 4 is a schematic representation of the demodulating circuit of the invention shown connected to a pulse shaping circuit capable of producing trapezoidal pulses.

In the circuit of FIG. 3, the means responsive to the input signal for shaping or squaring the input signal into substantially rectangular pulses corresponding to its frequency includes input blocking capacitor 21 which passes the incoming carrier signal. The collector-to-emitter current of transistor 22 is determined by the connection of its emitter through resistor 23 to fixed negative source 24 and by connection of its base to fixed negative source 25. Common junction 26 connected to the collector of transistor 22 is maintained at or near ground or a reference potential. The common base connection of transistor 22 provides a high impedence to its collector. As a result the collector-to-emitter current is dependent upon the value of sources 24 and 25 and resistor 23.

With no signal applied to the input at capacitor 21, the reference current flows through transistor 22. The reference current which originates in fixed positive source 27, divides equally through the pair of paths formed by resistor 30 and diode 31 as well as resistor 32 and diode 33. As soon as the potential between resistor 30 and diode 31 is less positive than the potential at junction 26, diode 31 is cut off and acts as a very high impedance. This occurs when negative signal excursions are applied to the input terminal at capacitor 21. The cut-off of the diode clips the additional magnitude of the negative excursions of the input signal.

When the input negative excursions are positive, diode 31 remains in the conducting state and causes junction 26 to follow the excursions. When the positive excursion of junction 26 reverse biases diode 33, transfer of further signals to amplifier 28 through capacitor 35 is inhibited, thereby clipping the positive signal excursions. In this way, there is provided a squaring circuit which presents the same input and output impedances regardless of the condition of the input signal during the time that the clipping action is being performed.

As shown in FIGURE 3, the signal from the squaring circuit is coupled to the base of transistor 28 of the amplifying circuit. The emitter and collector of transistor 28 are coupled to positive source 27 and negative source 24, respectively. The amplified output signal at the collector of transistor 28 is applied to timing capacitor 11 of the demodulating circuit. As a result the signal delivered by the circuit to timing capacitor 11 from the amplifying circuit is a symmetrical one having a substantially square-shaped form. Again the squared signal is demodulated in the manner described with respect to the circuit of the invention in FIG. 1.

In the embodiment of FIG. 4, the incoming frequency modulated carrier is first passed through squaring circuit 36 and is then introduced into a switching arrangement which includes transistors 37 and 38. Timing capacitor 44 in response to the incoming carrier is driven by fixed negative source 40 and fixed positive source 41. A negative current determined by resistor 45 is delivered to timing capacitor 44 from source 40 while a gated positive current is delivered to the capacitor from source 41. Where symmetrical pulses are desired, the gated current source has a value equal to twice the negative current. When the gated current source is cut "off" by the incoming carrier, the timing capacitor is charged negative at a rate determined by the values of the timing capacitor and the negative current source. The time interval produced by the circuit is determined by the charging rate and the threshold level of the negative level clamping circuit which includes diode 47.

Transistor 38 which is biased by the divider including resistors 42 and 53 conducts a predetermined current from positive source 41 and through resistor 43 to junction 44$a$ connected to the timing capacitor. The predetermined current is greater than the negative current flowing through resistor 45 with respect to negative source 40. The predetermined current from the positive source can commonly be twice the magnitude of the current from the negative source. When transistor 38 is conducting, it causes the timing capacitor to be charged in a positive direction until a level determined by the clamping action of diode 46 is reached. When the output from squaring circuit 36 is in the negative direction, transistor 37 conducts and diverts current passing through resistor 43 from passing through transistor 38. The conducting of transistor 37 removes the current from the positive source which was previously applied to junction 44$a$ and timing capacitor 44. As a result and in response to the current through resistor 45, capacitor 44 is charged in response to the current of the negative source. The changing of the charge upon the capacitor continues until the clamping level determined by diode 47 is reached.

As a result the wave form of the voltage on the timing capacitor is one having a trapezoidal shape. The number of pulses corresponds in frequency to the incoming carrier. Consequently the pulses delivered to the circuit of the invention, including transistors 48 and 49, are delivered during the interval when timing capacitor 44 is making an excursion from either clamped position to the other. Since the timing capacitor is not discharged between pulses, the pulse duty cycle can approach 100% without interaction between successive pulses and the output pulse width can be controlled using a single timing capacitor.

As previously described with respect to FIGS. 1–3, the positive and negative charging currents supplied to point 44$a$ flow through capacitor 44 and then through either transistor 48 or 49 as long as the voltage of point 44$a$ lies between the anode potential of diode 47 and the cathode potential of diode 46. Consequently the positive current pulses applied to resistor 50 from the collector of transistor 48 have a duration equal to the length of time required by timing capacitor 44 to charge from the anode potential of diode 47 to the cathode potential of diode 46 in response to the excess of current supplied from source 41 over the current drawn by source 40. The magnitude of the positive current pulses is equal to the difference between the currents from source 41 and to source 40.

Conversely, the negative current pulses applied to resistor 51 from the collector of transistor 49 have a duration equal to the length of time required by timing capacitor 44 to charge from the cathode potential of diode 46 to the anode potential of diode 47 in response to the current from source 40 (current from source 41 having been discontinued by a negative output from squaring circuit 36 as described above). The magnitude of the negative pulses is equal to the current drawn to source 40.

Thus the current supplied to resistor 50 and drawn from resistor 51 will be determined by the frequency of the square wave output of circuit 36. The demodulator intelligence bandwith may be substantially increased by inverting the output at either resistor 50 or 51 and combining it with the other.

While the invention has been described in its preferred embodiments, it is to be understood that the words which have been used are words of description rather than words of limitation and that changes within the purview of the appended claims may be made without departing from the true scope and spirit of the invention.

What is claimed:

1. A circuit for demodulating a frequency modulated carrier input signal comprising means responsive to the input signal for producing a waveform corresponding in frequency to the input signal, each successive excursion of the waveform being in the opposite sense between predetermined levels, means connected to said waveform producing means for storing charge in response to a charging current corresponding to the waveform, said storing means being adapted to be driven between additional predetermined levels of charge by said waveform producing means at each successive excursion of the waveform, a pair of means each connected to said storing means for conducting charging current with respect thereto, each of said conducting means being actuated in response to the charging current accompanying an excursion of the waveform applied to said storing means which has a different sense in order to conduct the charging current thereto, and means in circuit with at least one of said conducting means for producing an output signal in response to the charging current being conducted by said one conducting means, whereby said output signal represents a function of the frequency of the input signal.

2. A circuit for demodulating a frequency modulated carrier input signal comprising means responsive to the input signal for producing a waveform corresponding in frequency to the input signal, each successive excursion of the waveform being in the opposite sense between predetermined levels, a timing capacitance connected to said waveform producing means for storing charge in response to a charging current corresponding to the waveform, said timing capacitance being adapted to be driven between additional predetermined levels of charge by said waveform producing means at each successive excursion of the waveform, a pair of means each connected to said timing capacitance for conducting charging current thereto from sources of charging current, each of said conducting means being actuated in response to the charging current accompanying an excursion of the waveform applied to said timing capacitance which has a different sense in order to conduct the charging current thereto, and means in circuit with at least one of said conducting means for producing an output signal in response to the charging current being conducted by said one conducting means, whereby said output signal represents a function of the frequency of the input signal.

3. A circuit for demodulating a frequency modulated carrier input signal comprising means responsive to the input signal for producing a waveform corresponding in frequency to the input signal, each successive excursion of the waveform being in the opposite sense between predetermined levels, means connected to said waveform producing means for storing charge in response to a charging current corresponding to the waveform, said storing means being adapted to be driven between additional predetermined levels of charge by said waveform producing means at each successive excursion of the waveform, a pair of switching means connected to said storing means for conducting charging current with respect thereto, each of said switching means being actuated in response to the charging current accompanying an excursion of the waveform applied to said storing means which has a different sense in order to conduct the charging current thereto, and means in circuit with at least one of said switching means for producing an output signal in response to the charging current being conducted by said one switching means, whereby said output signal represents a function of the frequency of the input signal.

4. A circuit for demodulating a frequency modulated carrier input signal comprising means responsive to the input signal for producing a waveform corresponding in frequency to the input signal, each successive excursion of the waveform being in the opposite sense between predetermined levels, a timing capacitance connected to said waveform producing means for storing charge in response to a charging current corresponding to the waveform, said timing capacitance being adapted to be driven between additional predetermined levels of charge by said waveform producing means at each successive excursion of the waveform, a pair of means each connected to said timing capacitance for conducting charging current with respect thereto, each of said conducting means being actuated in response to the charging current accompanying an excursion of the waveform applied to said timing capacitance which has a different sense in order to conduct the charging current thereto, means in circuit with at least one of said conducting means for producing a signal in response to the charging current being conducted by said one conducting means, and means for filtering out the relatively higher frequency portion of the signal of said signal producing means to produce an output signal, whereby said output signal represents a function of the frequency of the input signal.

5. A circuit for demodulating a frequency modulated carrier input signal comprising means responsive to the input signal for producing a waveform corresponding in frequency to the input signal, each successive excursion of the waveform being in the opposite sense between predetermined levels, means connected to said waveform producing means for storing charge in response to a charging current corresponding to the waveform, said storing means being adapted to be driven between additional predetermined levels of charge by said waveform producing means at each successive excursion of the waveform, a pair of means each connected to said storing means for conducting charging current with respect thereto, each of said conducting means being actuated in response to an excursion of the charging current accompanying the waveform applied to said storing means which has a different sense in order to conduct the charging current thereto, means in circuit with each of said conducting means for producing signals in response to the charging currents being conducted by each of said conducting means, and means for combining the signals of each of said signal producing means to produce an output signal, whereby said output signal represents a function of the frequency of the input signal.

6. A circuit for demodulating a frequency modulated carrier input signal comprising means responsive to the input signal for producing a waveform corresponding in frequency to the input signal, each successive excursion of the waveform being in the opposite sense between predetermined levels, a timing capacitance connected to said waveform producing means for storing charge in response to a charging current corresponding to the waveform, said timing capacitance being adapted to be driven between additional predetermined levels of charge by said waveform producing means at each successive excursion of the waveform, a pair of means each connected to said timing capacitance for conducting charging current thereto from sources of charging current, each of said conducting means being actuated in response to an excursion of the charging current accompanying the waveform having a different sense in order to conduct the charging current thereto, means in circuit with each of said conducting means for producing signals in response to the charging current being conducted by each of said conducting means, means for inverting the signal responsive to the charging current conducted by one of said conducting means, and means for combining the signal being inverted and the signal of the other of said conducting means to produce an output signal, whereby said output signal represents a function of the frequency of the input signal.

7. A circuit for demodulating a frequency modulated carrier input signal comprising means responsive to the input signal for producing a waveform corresponding in frequency to the input signal, each successive excursion of the waveform being in the opposite sense between predetermined levels, a timing capacitor connected to said waveform producing means for storing charge in response to a charging current corresponding to the waveform, said timing capacitance being adapted to be driven between additional predetermined levels of charge by said waveform producing means at each successive excursion of the waveform, a pair of transistors each being connected in a grounded base configuration to said timing capacitor for conducting charging current with respect thereto, each of said transistors being actuated in response to and excursion of the charging current accompanying the waveform applied to said timing capacitor which has a different sense in order to conduct the charging current thereto, and means in circuit with at least one of said transistors for producing an output signal in response to the charging current being conducted by said one transistor, whereby said output signal represents a function of the frequency of the input signal.

8. A circuit for demodulating a frequency modulated carrier input signal comprising means responsive to the input signal for producing a waveform corresponding in frequency to the input signal, each successive excursion of the waveform being in the opposite sense between predetermined levels, a timing capacitor connected to said waveform producing means for storing charge in response to a charging current corresponding to the waveform, said timing capacitor being adapted to be driven between additional predetermined levels of charge by said waveform producing means at each successive excursion of the waveform, a PNP and a NPN transistor, each of said transistors having its emitter connected to said timing capacitor for conducting charging current with respect thereto and having its collector adapted to be connected to current sources of different polarity, each of said transistors being actuated in response to the charging current accompanying an excursion of the waveform applied to said timing capacitor which has an excursion with a different sense in order to conduct the charging current thereto, and an impedance in circuit with at least one of said transistors for producing an output signal in response to the charging current being conducted by said one transistor, whereby said output signal represents a function of the frequency of the input signal.

References Cited

UNITED STATES PATENTS

| | | | |
|---|---|---|---|
| 3,075,150 | 1/1963 | Berman et al. | 329—50 |
| 3,202,940 | 8/1965 | Dietrich | 332—43 |
| 3,209,253 | 9/1965 | Gray | 307—88.5 |
| 3,221,260 | 11/1965 | Henrion | 307—88.5 |
| 3,235,811 | 2/1966 | Steiger | 329—103 |

ALFRED L. BRODY, Primary Examiner.